Aug. 23, 1955 A. JOLLIVET 2,715,798
APPARATUS FOR GRINDING STOPPERS
Filed March 16, 1954 2 Sheets-Sheet 1

INVENTOR:
ANDRE JOLLIVET
By Young, Emery & Thompson
Attys.

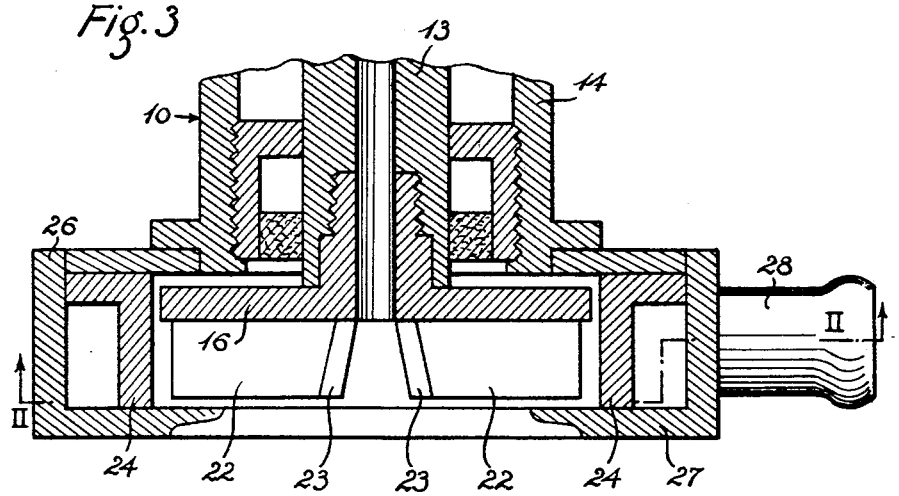
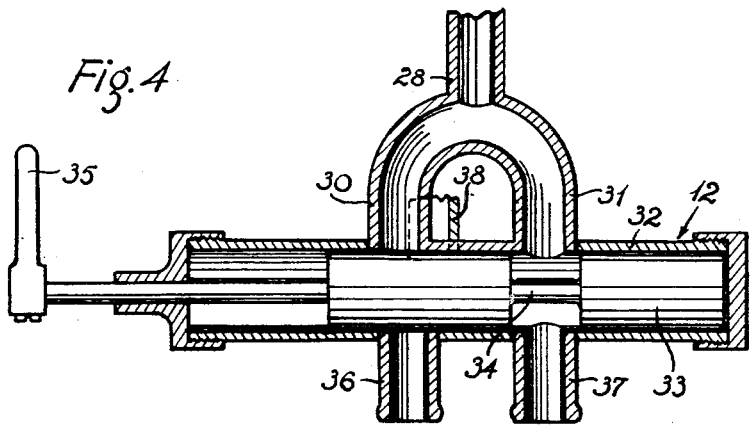

United States Patent Office 2,715,798
Patented Aug. 23, 1955

2,715,798

APPARATUS FOR GRINDING STOPPERS

André Jollivet, Paris, France

Application March 16, 1954, Serial No. 416,496

Claims priority, application France April 29, 1953

5 Claims. (Cl. 51—73)

In order to obtain a completely tight closure of bottles, flasks and the like with a stopper of the so-called emery type, it is necessary that the neck of the bottle and also the stopper should have conical surfaces with a true finish. It is, however, not rare to find in commerce stoppers the shape of which is fairly irregular and which give only a doubtful tightness to the closure.

The present invention has for its object an apparatus for grinding stoppers, and especially conical stoppers of material such as glass, which ensures a perfect grinding or machining of the stopper, which is simple to operate, simple to construct and the cost of which is low.

Other objects, features and advantages of the invention will, furthermore, be made evident from the description which follows below of a form of construction, chosen by way of example, with reference to the attached drawings in which:

Fig. 3 is a corresponding view in horizontal cross-section following the line III—III of Fig. 2;

Fig. 4 is a view in cross-section through a diameter of a distributor of liquid for the machine.

Figure 1:
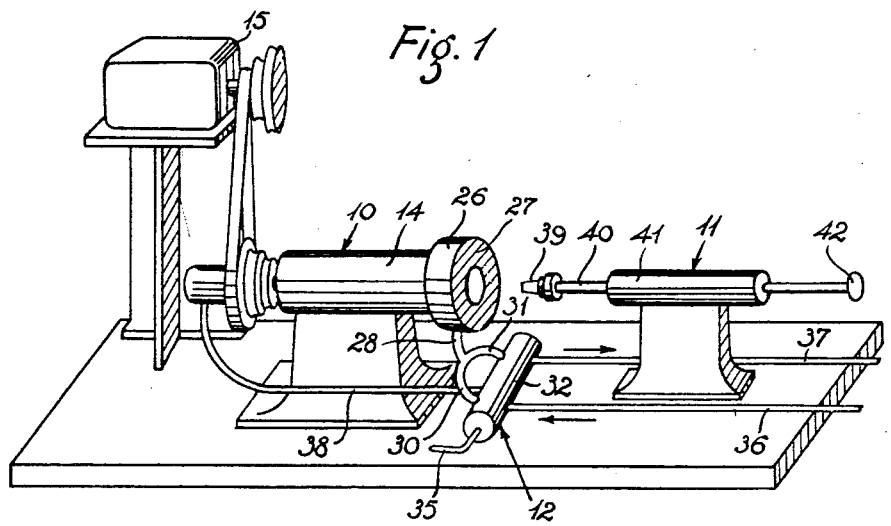
Fig. 1 is a general view in perspective of a machine in accordance with the invention.

In the form of embodiment shown, there is seen in Fig. 1 a machine for grinding conical stoppers of glass or other material. This machine comprises a rotatable tool-carrier 10, a sliding stopper holder 11 and a water distributor 12.

Figure 2:
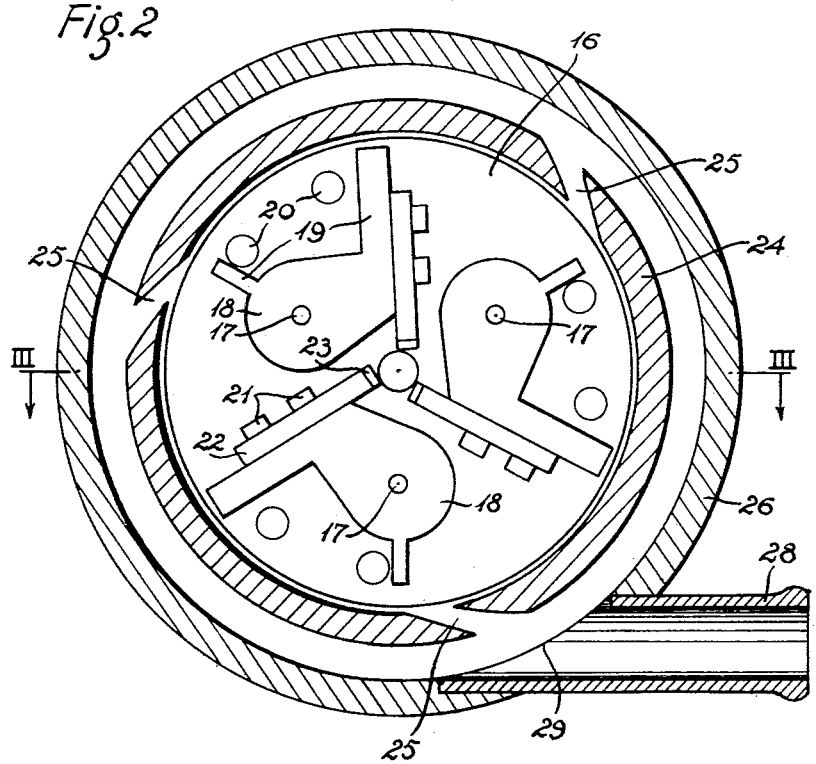
Fig. 2 is a view on an enlarged scale of a transverse vertical cross-section of the part of the machine indicated by line II—II in Fig. 3.

The tool carrier 10 consists of a hollow shaft 13 (Fig. 3) rotatably mounted in a circular frame 14 and driven at one of its extremities by a driving motor 15. At its other extremity, the shaft 13 carries a circular plate 16 (Figs. 2 and 3) on which are pivotally mounted at 17 three counterweights 18. Each counter-weight 18, freely mounted between two positions, comprises two blades 19 which are approximately radial with respect to the plate 16 and which co-operate with two abutment studs 20 fixed to this plate. To one of these blades 19, there is fixed at 21 a small plate 22, also approximately radial with respect to the plate and the internal extremity 23 of which is of abrasive material such as a diamond-impregnated concretion. Each extremity 23 is at an angle with respect to the axis of the shaft 13 so as to follow the conical angle of the stoppers to be ground. Around the plate 16 and the counter-weights 18, there passes a ring 24 fixed to the frame 14 and provided with tangential openings at 25. A casing 26 also fixed to the frame 14, extends around the ring 24 and spaced apart therefrom, and comprises at its end a flange 27 turned over towards the interior so as to protect the rotating parts and to avoid splashing of liquid as will be described later.

A conduit 28 (Figs. 1 to 4) is tangentially joined at 29 to the annular space provided between the casing 26 and the ring 24. The conduit 28 branches into two parts 30 and 31 which are connected to the cylinder 32 of the distributor 12. There will be seen at 33 the piston of the distributor provided with an internal diametrical passage 34 and an external operating handle 35. Opposite to the conduit 30, there is connected to the cylinder 32 a supply pipe 36 for water under pressure, and opposite to the conduit 31 a conduit 37 is connected to the cylinder 32 constituting the water outlet.

By the side of the conduit 30 and opposite the supply pipe 36, an auxiliary pipe 38 is coupled to the cylinder 32 and extends up to the extremity of the drilled-out portion of the shaft 13 opposite to the plate 16.

As can be seen from Fig. 1, each stopper 39 to be ground is placed at the end of a rod 40 which is slidably mounted in a support 41 and provided with an operating handle 42, so that the stopper may thus be brought up at will to the plate 16 until it is opposite the abrasive extremities 23.

Before grinding the stopper 39, the piston 33 of the distributor 12 is moved by the handle 35 until it closes the ports of the conduits 30, 36 and 38, the passage 34 being then located opposite the conduits 31 and 37. The water supply to the machine is thereby cut-off.

The motor 15 rotates and drives the shaft 13 and also the face-plate 16. The counter-weights 18 are subjected to the centrifugal effect and the extremities 23 are thus moved away from the axis of the face-plate, the corresponding blades 19 being forced against the abutments 20. The stopper 39 is moved by the handle 32 until it is opposite the extremities 23 which, by reason of centrifugal force, are maintained radially apart from the stopper.

The handle 35 is then operated so as to place the conduit 38 into communication with the supply pipe 36. The water then passes through the conduit 38 and then the drilled portion of the shaft 13 and streams on to the end of the stopper 39. The lateral movement of the handle 35 is then continued until the conduit 30 communicates with the conduit 36. Water then passes through the conduit 30 and the conduit 28 and is tangentially ejected at 29 into the annular space comprised between the rings 24 and 26 and it is there given a vortex motion. The water escapes through the tangential openings 25 into the space inside the ring 24 in the form of powerful jets which act on the blades 19 in opposition to the effect of centrifugal force and apply the abrasive extremities 23 against the stopper 39 with a substantial but elastic force. The stopper is thus efficiently ground in a liquid medium. After grinding, the handle 35 is pushed in until the passage 34 comes opposite to the conduits 31 and 37. The entire water supply is cut-off, the extremities 23 move outwards away from the stopper under the action of centrifugal force which becomes once more predominant, and the water which is wholly retained by the portion 27 is passed out to waste through the conduits 28, 31 and 37.

It will be understood that the whole sequence of these operations is very rapid and is carried out in practice in a few seconds.

What I claim is:

1. An apparatus for grinding stoppers, comprising in combination a non-rotating stopper support, mounted to slide axially of the said stopper, a face-plate adapted to be rotatably driven, a circular row of members of abrasive material forming an interior passage co-axial with the said stopper, each said member being pivotally mounted on the said face-plate, abutment members on the said face-plate to limit the travel of each member between two positions, a counter-weight on each member, at least one radial blade on each member, and means for projecting liquid jets against the said blades so as to supply the grinding area with liquid and to overcome the effect of the centrifugal force acting on the said counter-weights and to apply elastically the said members against the stopper.

2. An apparatus as claimed in claim 1, in which the said jets are expelled from openings formed tangentially in the internal wall of an annular space to which a pipe is tangentially connected.

3. An apparatus as claimed in claim 2 in which the said conduit divides into two branches, the one a supply branch, the other an outlet branch, a distributor being applied to these two branches in such manner as to open one of the said branches and to close the other and vice-versa.

4. An apparatus as claimed in claim 3, in which an auxiliary conduit is connected to the said distributor in the vicinity of the supply branch and is connected to a hollow shaft carrying the said face-plate, in such manner that shortly before the formation of the tangential jets for grinding and application of liquid, the said auxiliary conduit provides a slight preliminary wetting.

5. An apparatus for grinding stoppers, comprising in combination a non-rotating stopper support mounted to slide axially of the stopper, a face plate to be rotatably driven, a circular row of members of abrasive material forming an interior passage co-axial with the stopper, each said member being pivotally mounted on the said face plate and subjected to centrifugal force tending to displace the said member from the axis of the stopper, and tangential jets of fluid admitted close to the said face plate and adapted to act on the members so as to overcome the effect of centrifugal force and to force elastically the members against the stopper.

References Cited in the file of this patent

UNITED STATES PATENTS

| 435,698 | Lamkin | Sept. 2, 1890 |
| 997,167 | Werth | July 4, 1911 |
| 2,065,221 | Hellyar | Dec. 22, 1936 |
| 2,164,867 | Blood | July 4, 1939 |